Patented July 24, 1934

1,967,668

UNITED STATES PATENT OFFICE 1,967,668

PROCESS OF PREPARING ANHYDRIDES OF HALOGEN FATTY ACIDS

Paul Heisel, Gersthofen, near Augsburg, Germany, assignor to I. G. Farbenindustrie Aktiengesellschaft, Frankfort-on-the-Main, Germany No Drawing. Application October 1, 1930, Serial No. 485,828. In Germany October 19, 1929

4 Claims. (Cl. 260—123)

The present invention relates to a process of preparing anhydrides of halogen fatty acids.

I have found that the anhydrides of the halogen fatty acids can be prepared by causing sulfuryl chloride or the components thereof to react upon the anhydrous salts of the halogen fatty acids, in the presence of a suspending or dissolving agent having an accelerating action upon the reaction.

Whereas the reaction takes place only very slowly and incompletely in the presence of ethers, aliphatic and aromatic hydrocarbons and the halogen derivatives thereof as suspending or dissolving agents, it is a surprising fact that acetic acid alkyl esters which are liquid at the reaction temperature, such as acetic acid ethyl ester have been found to be very good accelerators by which the reaction is quickly completed, when the mass is thoroughly stirred and the reaction heat is removed. As compounds which have an accelerating action upon the reaction there may be used, for instance, the esters of formic acid, acetic acid, oxalic acid, benzoic acid, monochloro acetic acid, dichloroacetic acid and trichloroacetic acid. In comparative trials which have been carried out under equal conditions and in which on the one hand ethers and on the other hand esters or anhydrides have been used as suspending agents, only yields of maximum 55 per cent. are obtained when using ethers and observing exactly the same times of reaction, whereas nearly quantitative yields are produced when esters or anhydrides are used.

The reaction may be carried out at ordinary temperature or at a raised temperature which suitably does not exceed 50° C.

In order to isolate the anhydride of the halogen fatty acid from the reaction mass, the suspending or dissolving agent is eliminated by distillation; the anhydride is then distilled, suitably while applying a reduced pressure.

Instead of sulfuryl chloride there may be used with equal success the components thereof or other acid chlorides as for instance phosgene, phosphor-oxy-chloride. The use of chlorine in the presence of a chlorine carrier is to be regarded as an equivalent of the use of acid chloride. As salts of the halogen fatty acid there may advantageously be used the anhydrous salts of the alkali metals or of the alkaline-earth metals or mixtures thereof.

The following examples illustrate the invention, but they are not intended to limit it thereto, the parts being by weight:

1. 4 mols of anhydrous sodium monochloroacetate in a sufficient quantity of acetic acid ethyl ester are mixed with 1 mol of sulfuryl chloride at ordinary or at raised temperature, for instance at 50° C., while eliminating the reaction heat and well stirring. When the reaction is complete and the solvent has been eliminated by distillation, the residue is subjected to distillation, suitably while stirring. The yield of anhydride of halogen fatty acid amounts to 90% to 95%, while in ether under exactly the same conditions only maximum 55 per cent are obtained.

2. 4 mols of sodium trichloroacetate are suspended in oxalic ester and 1 mol of phosgene is introduced therein while removing the reaction heat. The reaction products are worked up as described in Example 1. The yield amounts to 90 per cent of the theory.

3. Into a suspension of 4 mols of anhydrous calcium dichloroacetate in acetic anhydride 3 mols of chlorine are introduced in the presence of 0.5 mol of chloride of sulfur. The reaction products are worked up according to Example 1. The yield amounts to 90 per cent of the theory.

4. Into a suspension of 2 mols of anhydrous calcium bromoacetate in propionic anhydride 1 mol each of sulfurous acid and chlorine are introduced, while stirring and removing the reaction heat. The reaction products are worked up as described in Example 1.

5. To 4 mols of sodium $\alpha$-chlorocrotonate in a suspension of acetic ester 1 mol of sulfuryl chloride is added as in Example 1. The reaction products are worked up as described in that example. The yield amounts to 85 per cent of the theory.

6. 2 mols of calcium $\alpha$-bromoisovaleriate in acetic ester are mixed with 1 mol of sulfuryl chloride, as described in Example 1. 80 per cent of the anhydride of $\alpha$-bromoisovaleric acid are obtained.

I claim:

1. The process which comprises causing an acid chloride selected from the group consisting of sulfuryl chloride, phosgene and phosphor-oxychloride to act upon an anhydrous salt of a halogen fatty acid with an alkali-forming metal in the presence of a liquid acetic acid alkyl ester in an amount sufficient to dissolve or suspend the salt.

2. The process which comprises causing an acid chloride selected from the group consisting of sulfuryl chloride, phosgene and phosphor-oxychloride to act upon an anhydrous salt of a halogen fatty acid with an alkali-forming metal in the presence of acetic acid ethyl ester in an amount sufficient to dissolve or suspend the salt.

3. The process which comprises causing sulfuryl chloride to act upon an anhydrous alkali metal salt of a halogen fatty acid in the presence of acetic acid ethyl ester in an amount sufficient to dissolve or suspend the salt.

4. The process which comprises causing sulfuryl chloride to act upon anhydrous sodium monochloracetate in the presence of acetic acid ethyl ester in an amount sufficient to dissolve or suspend the salt.

PAUL HEISEL.